United States Patent
Yanagisawa (10) Patent No.: US 8,349,119 B2
(45) Date of Patent: Jan. 8, 2013

(54) METHOD AND APPARATUS FOR LAMINATING ULTRAVIOLET CURING TYPE WAVEGUIDE MATERIAL

(75) Inventor: Kenji Yanagisawa, Nagano (JP)

(73) Assignee: Shinko Electric Industries Co., Ltd., Nagano-shi, Nagano (JP)

( * ) Notice: Subject to any disclaimer, the term of this patent is extended or adjusted under 35 U.S.C. 154(b) by 173 days.

(21) Appl. No.: 12/204,178

(22) Filed: Sep. 4, 2008

(65) Prior Publication Data

US 2009/0065139 A1 Mar. 12, 2009

(30) Foreign Application Priority Data

Sep. 7, 2007 (JP) ................................ 2007-233349

(51) Int. Cl.
| | |
|---|---|
| B29C 65/00 | (2006.01) |
| B29C 35/08 | (2006.01) |
| B29C 35/10 | (2006.01) |
| B31B 1/60 | (2006.01) |
| B32B 37/00 | (2006.01) |
| B32B 38/04 | (2006.01) |
| B29D 28/00 | (2006.01) |
| D02G 1/20 | (2006.01) |
| D02J 1/22 | (2006.01) |

(52) U.S. Cl. ............... 156/275.5; 156/60; 156/272.2; 264/494; 264/495; 264/496; 264/103

(58) Field of Classification Search ............... 156/345.5, 156/275.5, 60, 272.2; 264/494–496, 103
See application file for complete search history.

(56) References Cited

U.S. PATENT DOCUMENTS

2002/0051866 A1* 5/2002 Mullen .................. 428/156

FOREIGN PATENT DOCUMENTS

| GB | 2253917 | * | 9/1992 |
|---|---|---|---|
| JP | 04-346322 A | | 12/1992 |
| JP | 7-218921 | | 8/1995 |
| JP | 08-005973 A | | 1/1996 |
| JP | 08005973 | * | 1/1996 |
| JP | 08-087019 A | | 4/1996 |
| JP | 8-201747 | | 8/1996 |
| JP | 11-293202 | | 10/1999 |
| JP | 2004-219446 A | | 8/2004 |
| JP | 2007-031555 | | 2/2007 |

* cited by examiner

Primary Examiner — Christopher Schatz
Assistant Examiner — Matthew Hoover
(74) Attorney, Agent, or Firm — Drinker Biddle & Reath LLP (57) ABSTRACT

A base plate (31) and an ultraviolet curing type waveguide material (32) are interposed between a pair of films (41, 42), a portion between the pair of films is decompressed or an external pressure is applied to the films, thereby laminating the ultraviolet curing type waveguide material on the base plate, and at the same time, ultraviolet rays are irradiated on the ultraviolet curing type waveguide material through the films to cure the waveguide material.

3 Claims, 11 Drawing Sheets

METHOD AND APPARATUS FOR LAMINATING ULTRAVIOLET CURING TYPE WAVEGUIDE MATERIAL

BACKGROUND OF THE INVENTION

The present invention relates to a method and apparatus for laminating an ultraviolet curing type waveguide material, and more particularly to a method and apparatus for laminating an ultraviolet curing type waveguide material which can execute a laminating process and an ultraviolet irradiating process at the same time.

In the case in which an ultraviolet curing type waveguide material is laminated, conventionally, an ultraviolet irradiating process is carried out after a laminating process is executed. For this reason, it is necessary to execute two independent processes including the laminating process and the ultraviolet irradiating process. Correspondingly, a tact time and a cost are increased. Moreover, there is a fear that deformation or peeling might be caused because a resin material is uncured after the laminating process.

As an example of a conventional method of laminating an ultraviolet curing type waveguide material, the case in which an optical waveguide is manufactured will be described with reference to FIGS. 1 to 4.

Figure 1A:
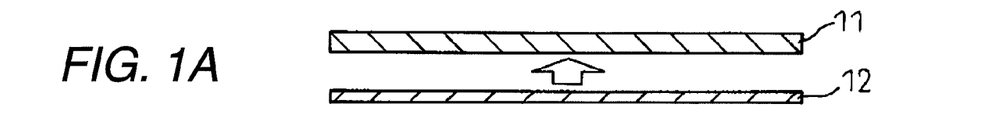
FIGS. 1A to 1K are views showing a conventional process for laminating an ultraviolet curing type waveguide material.

First of all, a first optical waveguide material 12 is laminated on a base plate 11 in FIG. 1A. The base plate 11 is thin plate-shaped, and a resin plate such as an acrylic resin plate or a polycarbonate plate or a metal plate is used, for example. For the first optical waveguide material 12, typically, ultraviolet curing type epoxy based resin materials or other ultraviolet curing type materials, for example, acryl based, fluorine polyimide based or silicone based ultraviolet curing type materials are used.

Figure 1B:
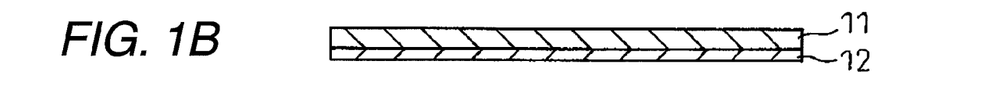
Figure 2A:
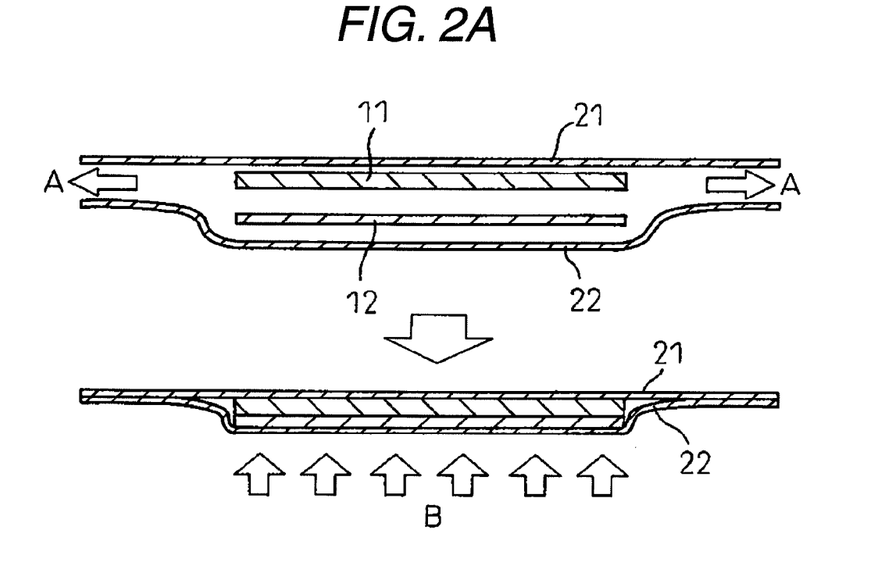
FIGS. 2A and 2B are views showing a method and apparatus for laminating a first optical waveguide material on a base plate through an evacuation in the conventional example of FIG. 1.
Figure 2B:
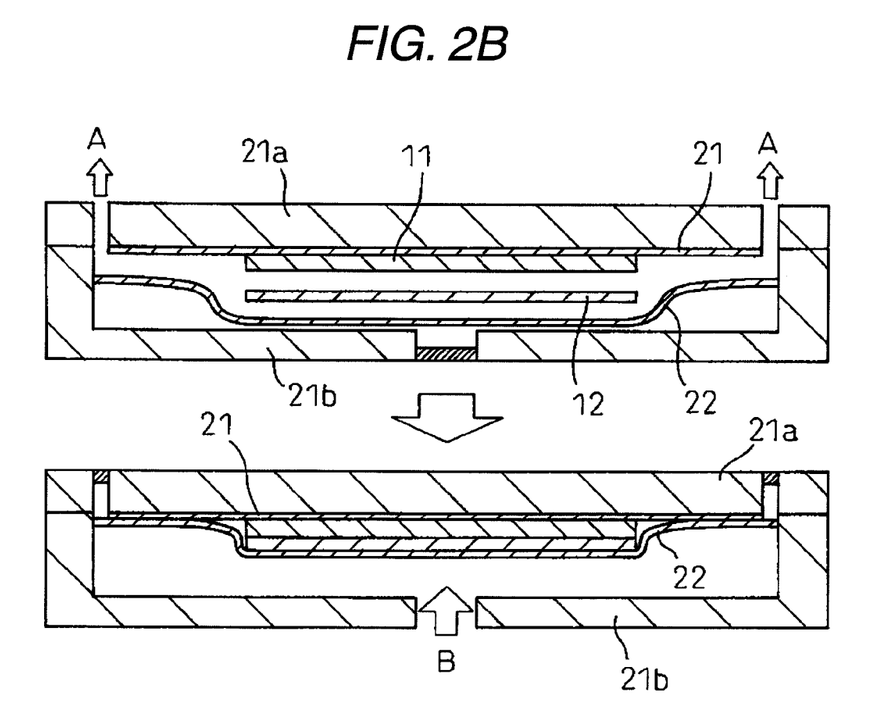

FIGS. 2A and 2B show a method and apparatus for executing the step of FIG. 1A in which the first optical waveguide material 12 is laminated on the base plate 11 through an evacuation. A material to be laminated, that is, the base plate 11 is fixed to a laminate film 21 (a housing 21a) side, and the base plate 11 and the first optical waveguide material 12 which is uncured are interposed between two laminate films 21 and 22, the two laminate films 21 and 22 are decompressed and evacuated (an arrow A), and a uniform load is then applied through air from an outside of the laminate film 22 at the first optical waveguide material 12 side (an arrow B). Through the laminating step, the first optical waveguide material 12 is bonded to the laminated base plate 11 as shown in FIG. 1B.

Figure 1C:
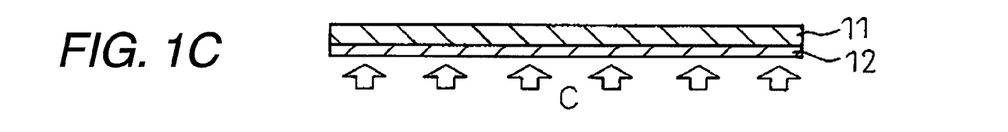

In FIG. 1C, next, ultraviolet rays are irradiated on the first optical waveguide material 12 (an arrow C) to cure the first optical waveguide material 12. In addition to the case in which the ultraviolet rays are irradiated to cure the first optical waveguide material 12, the first optical waveguide material 12 is cured through thermal curing in some cases.

Figure 1D:
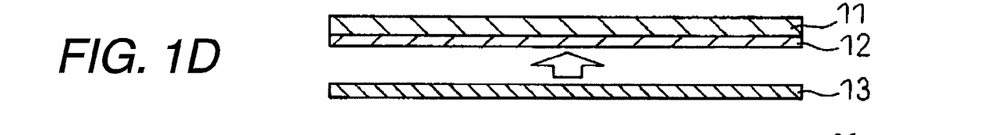

In FIG. 1D, next, the first optical waveguide material 12 is laminated on the base plate 11 and a second optical waveguide material 13 is further laminated on the first optical waveguide material 12 which is cured.

Figure 1E:
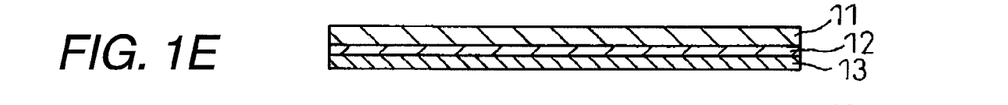
Figure 3A:
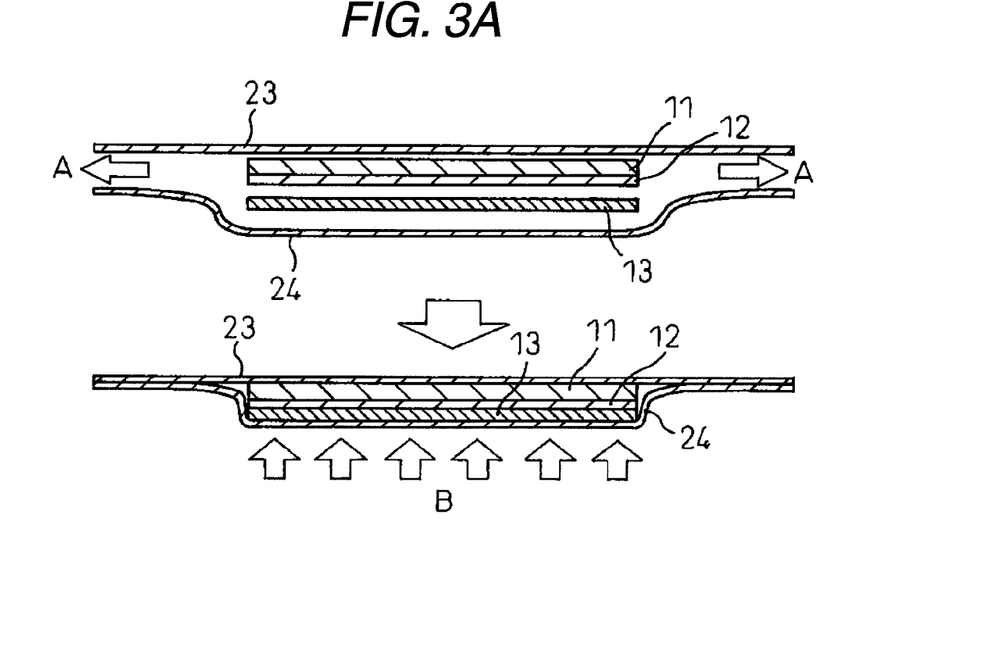
FIGS. 3A and 3B are views showing a method and apparatus for laminating a second optical waveguide material on the first optical waveguide material through an evacuation in the conventional example of FIG. 1.
Figure 3B:
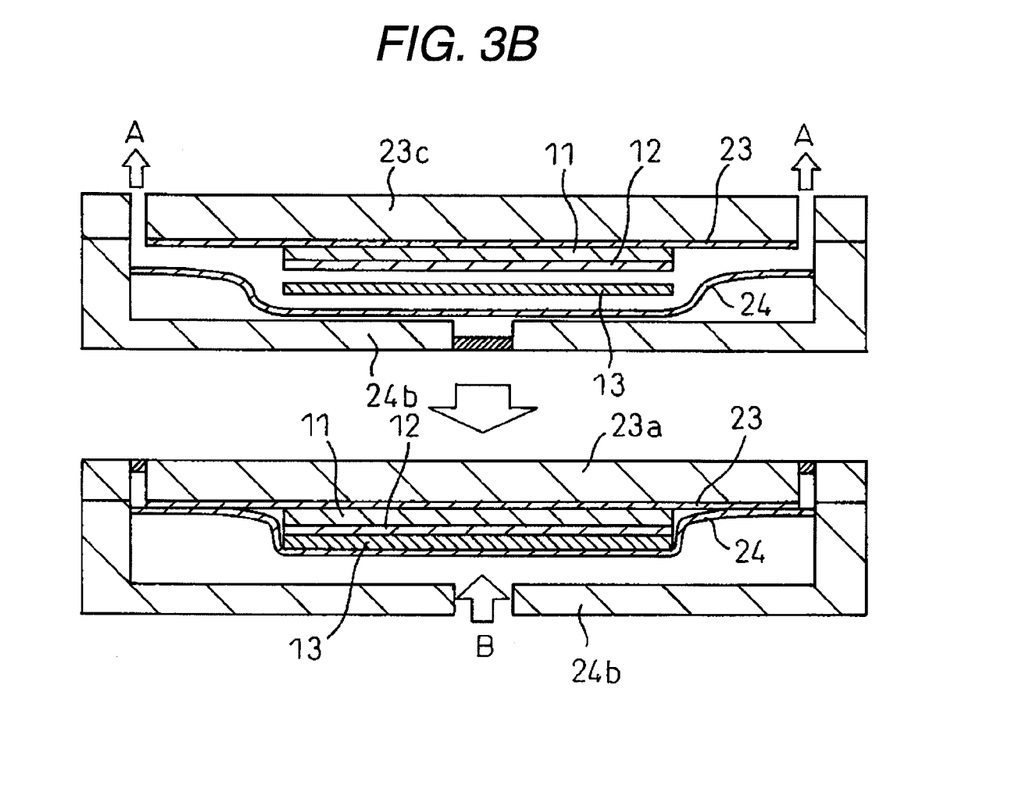

FIGS. 3A and 3B show a method and apparatus for executing the step illustrated in FIG. 1D in which the second optical waveguide material 13 is laminated on the first optical waveguide material 12 through an evacuation. A laminated product constituted by the base plate 11 and the first optical waveguide material 12 which is cured and the second optical waveguide material 13 which is uncured are interposed between two laminated films 23 and 24, and a portion between the two laminated films 23 and 24 is decompressed and evacuated (an arrow A) and a uniform load is then applied through air from an outside of the laminate film 24 at the second optical waveguide material 13 side (an arrow B). Through the laminating step, the laminated product constituted by the base plate 11 and the first optical waveguide material 12 which is cured, and the second optical waveguide material 13 which is uncured are laminated. A laminated product constituted by the base plate 11, the first optical waveguide material 12 and the second optical waveguide material 13 is shown in FIG. 1E.

Figure 1F:
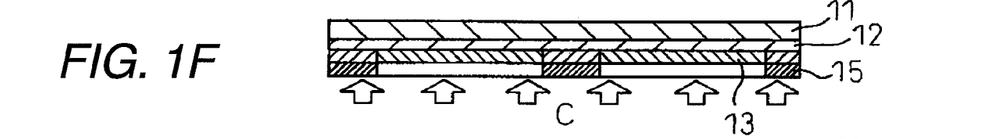
Figure 1G:
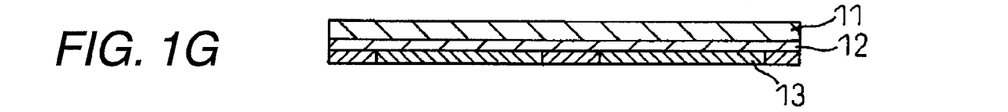
Figure 1H:
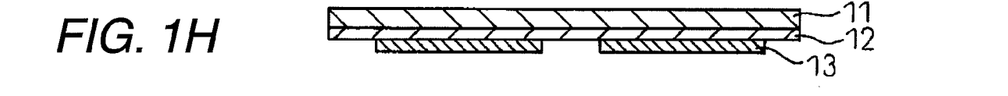

In FIG. 1F, next, the second optical waveguide material 13 is exposed and patterned by a well-known method using a mask 15. The laminated product thus exposed and pattered is shown in FIG. 1G. In FIG. 1H, the second optical waveguide material 13 is developed so that the patterning is completed.

Figure 1I:
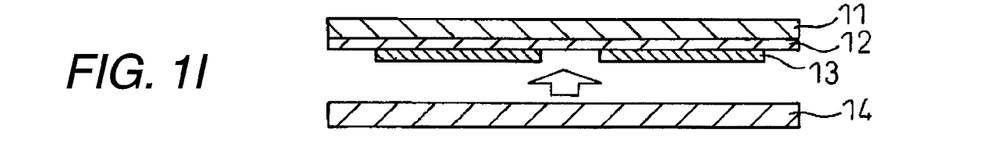

In FIG. 1I, a third optical waveguide material 14 is laminated on the second optical waveguide material 13. A material of the third optical waveguide material 14 is the same as that of the first optical waveguide material 12.

Figure 4A:
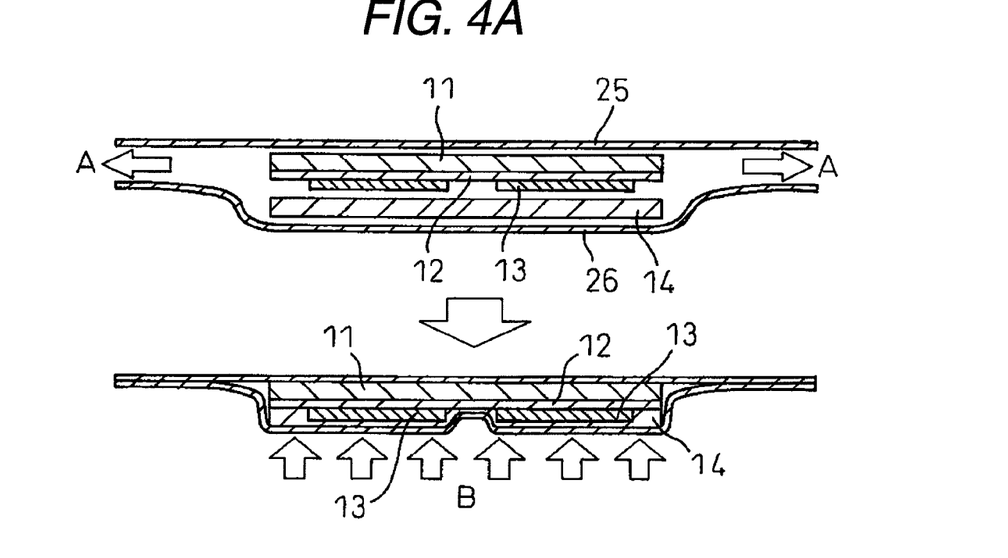
FIGS. 4A and 4B are views showing a method and apparatus for laminating a third optical waveguide material on the second optical waveguide material 13 through an evacuation in the conventional example of FIG. 1.
Figure 4B:
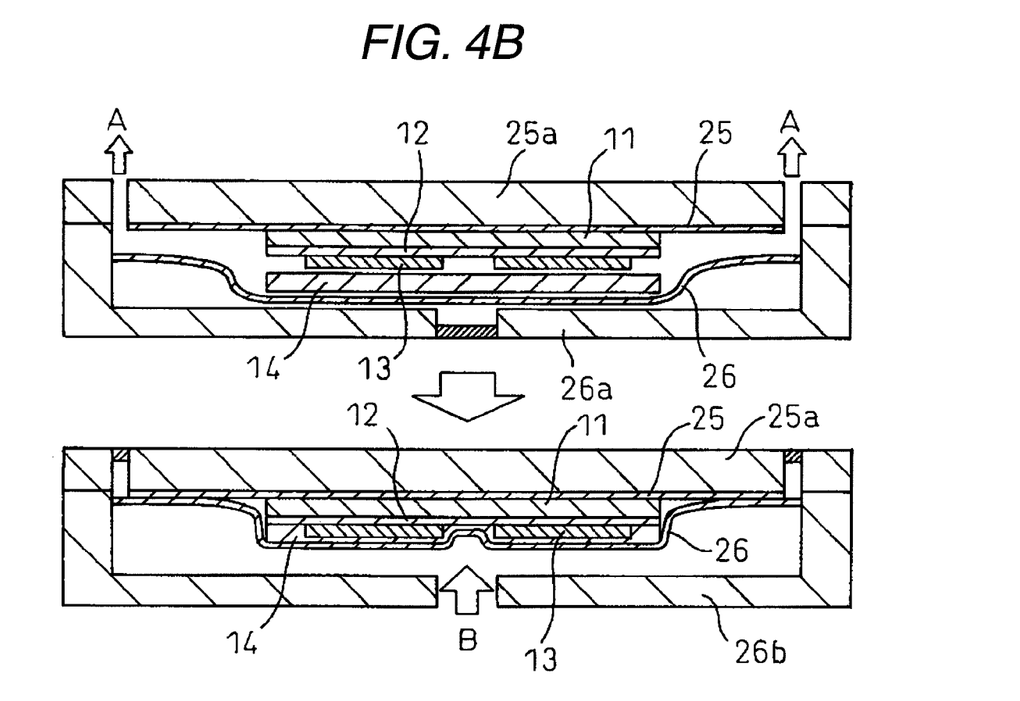

FIGS. 4A and 4B show a method and apparatus for executing the step illustrated in FIG. 1I in which the third optical waveguide material 14 is laminated on the second optical waveguide material 13 through an evacuation. The laminated product constituted by the base plate 11, the first optical waveguide material 12 which is cured and the second optical waveguide material 13 which is uncured, and the third optical waveguide material 14 are interposed between two laminated films 25 and 26, and a portion between the two laminated films 25 and 26 is decompressed and evacuated (an arrow A) and a uniform load is then applied through air from an outside of the laminate film 26 at the third optical waveguide material 14 side (an arrow B).

Figure 1J:
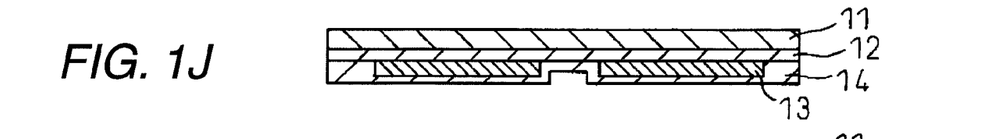

FIG. 1J shows a laminated product constituted by the base plate 11, the first optical waveguide material 12, the second optical waveguide material 13 and the third optical waveguide material 14 which is fabricated through the laminating steps.

Figure 1K:
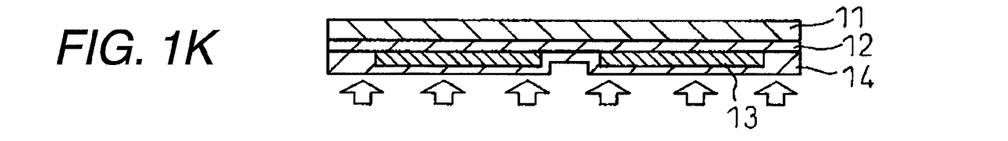

In FIG. 1K, subsequently, ultraviolet rays are irradiated on the third optical waveguide material 14 to cure the third optical waveguide material 14. In addition to the case in which the ultraviolet rays are irradiated to cure the third optical waveguide material 14, the third optical waveguide material 14 is cured through thermal curing in some cases.

As described above, according to the conventional method of laminating an ultraviolet curing type waveguide material, the laminating process is carried out and the ultraviolet irradiating step is then executed. Moreover, the laminating process employs a method of interposing a laminating material (uncured) and a material to be laminated (usually cured) by using laminate films and carrying out an evacuation, and then performing a pressurization uniformly through air. In the case in which a lamination is carried out over a material having concavo-convex portions, accordingly, a lamination through pressing has a problem in that air bubbles are mixed into a laminating surface. In the conventional laminating method using a vacuum pressurization, the problem can be avoided.

As the related art, JP-A-Hei7-218921 (Patent Document 1) has disclosed a method of manufacturing a liquid crystal panel in which a pair of substrates bonded in the air are left in vacuum and a pressure is applied from both sides left in vacuum in the case in which a liquid crystal panel is manufactured.

JP-A-Hei8-201747 (Patent Document 2) has disclosed a method of manufacturing a liquid crystal panel in which when a plurality of glass substrates are to be stuck to a glass substrate, the glass substrate and the glass substrates are overlaid respectively through an ultraviolet curing resin containing an internal holding material, closed chambers are formed through a division in respective outer peripheral positions of the smaller glass substrate, a pressure is reduced in each of the closed chambers to pressurize the glass substrates in the air, and ultraviolet rays are then irradiated on an ultraviolet curing resin to cure the ultraviolet curing resin.

In JP-A-Hei11-293202 (Patent Document 3), moreover, it is an object to implement a lamination for satisfying necessary functions such as an alignment of two substrates in the lamination, an ultraviolet irradiation or a uniform pressurization and bond of the substrates. By switching an evacuating apparatus and a pressurized air supplying apparatus, the two substrates are uniformly pressurized and bonded, and furthermore, ultraviolet rays are transmitted through an ultraviolet transmitting plate and an upper substrate and are thus irradiated on a seal member between the upper and lower substrates so that an ultraviolet curing resin in the seal is cured.

According to the conventional method of laminating an ultraviolet curing type waveguide material described with reference to FIGS. 1 to 4, the step of irradiating ultraviolet rays is to be executed after the step of laminating a substrate is carried out. Therefore, it is necessary to execute two independent processes including a substrate laminating process and an ultraviolet irradiating process. Correspondingly, a tact time and a cost are increased. Moreover, there is a fear that deformation or peeling might be caused because a resin material is uncured after the laminating process.

In the method of manufacturing a liquid crystal panel which is disclosed in the Patent Document 1, there is suggested a substrate laminating method which combines an evacuation of a pair of substrates and a uniform pressurization through air. However, the substrate laminating method is applied to a process for manufacturing a liquid crystal panel and is not applied to the case in which an ultraviolet curing type waveguide material is laminated. Moreover, the ultraviolet irradiating process is not disclosed.

In the method of manufacturing a liquid crystal panel which is disclosed in the Patent document 2, in the case in which a glass substrate and glass substrates are laminated to cure an ultraviolet curing resin, it is necessary to execute an ultraviolet irradiating step after carrying out a substrate laminating step in the same manner as in the prior art. For this reason, it is necessary to execute two independent processes including a substrate laminating process and an ultraviolet irradiating process. Correspondingly, a tact time and a cost are increased.

Also in the method of manufacturing a liquid crystal panel which is disclosed in the Patent Document 3, moreover, the substrates are uniformly pressurized and bonded by using two methods including an evacuation and a pressurization through air in the case in which the substrates are laminated, and ultraviolet curing is carried out as a subsequent step. In the same manner as in the prior art, therefore, it is necessary to execute the ultraviolet irradiating step after carrying out the substrate laminating step. For this reason, it is necessary to execute two independent processes including a substrate laminating process and an ultraviolet irradiating process. Correspondingly, a tact time and a cost are increased.

SUMMARY OF THE INVENTION

Therefore, it is an object of the invention to provide a method and apparatus for laminating an ultraviolet curing type waveguide material in which it is possible to correspondingly decrease a tact time and a cost without requiring to execute two independent processes including a material laminating process and an ultraviolet irradiating process and it is possible to prevent a material from being deformed and peeled due to a resin after a lamination by executing the lamination and curing through an ultraviolet irradiation in the same process in the case in which at least two ultraviolet curing type waveguide materials are laminated mutually and ultraviolet rays are irradiated on at least one of the two ultraviolet curing type waveguide materials so as to be cured.

In order to achieve the object, according to a first aspect of the invention, there is provided a method of laminating an ultraviolet curing type resin material, including the steps of:

interposing a base plate and an ultraviolet curing type resin material between a pair of films, and laminating the resin material on the base plate by decompressing a portion between the pair of films or by applying an external pressure to the films with irradiating ultraviolet rays on the resin material through the films to cure the resin material.

Moreover, according to a second aspect of the invention, there is provided a method of laminating an ultraviolet curing type waveguide material, including the steps of:

laminating a first optical waveguide material on a base plate through a pressurization with irradiating ultraviolet rays on the first optical waveguide material to cure the first optical waveguide material, laminating a second optical waveguide material on the first optical waveguide material through a pressurization with irradiating ultraviolet rays on the second optical waveguide material through a mask to carry out patterning, and laminating a third optical waveguide material on the second optical waveguide material through a pressurization with irradiating ultraviolet rays on the third optical waveguide material to cure the third optical waveguide material.

According to a third aspect of the invention, in the second aspect of the invention, preferably, all of the first, second and third optical waveguide materials are ultraviolet curing type resin materials, and the second optical waveguide material has at least a different refractive index component from that of each of the first and third optical waveguide materials.

Furthermore, according to a forth aspect of the invention, there is provided an apparatus for laminating an ultraviolet curing type resin material including:

a laminating device for laminating an ultraviolet curing type resin material on a base plate by decompressing a portion between a pair of films or by applying an external pressure to the films after interposing the base plate and the ultraviolet curing type resin material between the pair of films, and an irradiating device for irradiating ultraviolet rays on the resin material through the films, wherein an open portion is provided with the laminating device, and a pressure glass capable of transmitting the ultraviolet rays is provided on the open portion in order to irradiate the ultraviolet rays through the irradiating device while carrying out a laminating step by the laminating device.

According to a fifth aspect of the invention, in the forth aspect of the invention, preferably, the ultraviolet curing type resin material is a waveguide material made of an ultraviolet curing type resin.

According to a sixth aspect of the invention, in the second aspect of the invention, preferably, the second optical waveguide material has a refractive index component larger than that of each of the first and third optical waveguide materials.

According to the invention, two independent processes including the material laminating process and the ultraviolet irradiating process can be carried out in a processing at a step. Therefore, a tact time and a cost can be decreased correspondingly. By carrying out the lamination and the curing through the ultraviolet irradiation in the same process, moreover, it is possible to prevent a material from being deformed and peeled due to the resin after the lamination.

DETAILED DESCRIPTION OF THE PREFERRED EMBODIMENTS

An embodiment according to the invention will be described below in detail with reference to the accompanying drawings.

FIGS. 5A to 5G and FIGS. 6 to 8 show a first embodiment of a method and apparatus for laminating an ultraviolet curing type waveguide material according to the invention.

Figure 5A:
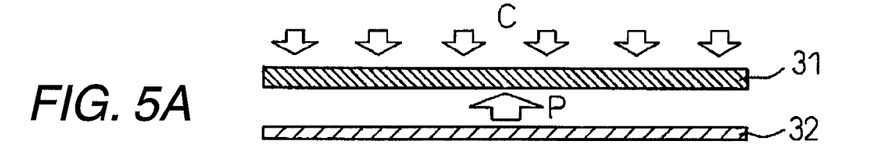
FIGS. 5A to 5G are views showing a process for laminating an ultraviolet curing type waveguide material according to an embodiment of the invention.

In FIG. 5A, first of all, a first optical waveguide material 32 is laminated on one of surfaces (a lower surface) of a base plate 31 of an ultraviolet transmitting type which is a material to be laminated, and at the same time, ultraviolet rays are irradiated on the first optical waveguide material 32 through the base plate 31 to cure the first optical waveguide material 32. The base plate 31 is thin plate-shaped, and a resin plate such as an acrylic resin plate or a polycarbonate plate or a metal plate is used in the same manner as in the conventional art. For the first optical waveguide material 32, typically, it is possible to use an ultraviolet curing type epoxy based resin material or other acryl based, fluorine polyimide based or silicone based ultraviolet curing type materials in the same manner as in the conventional art.

Figure 6A:
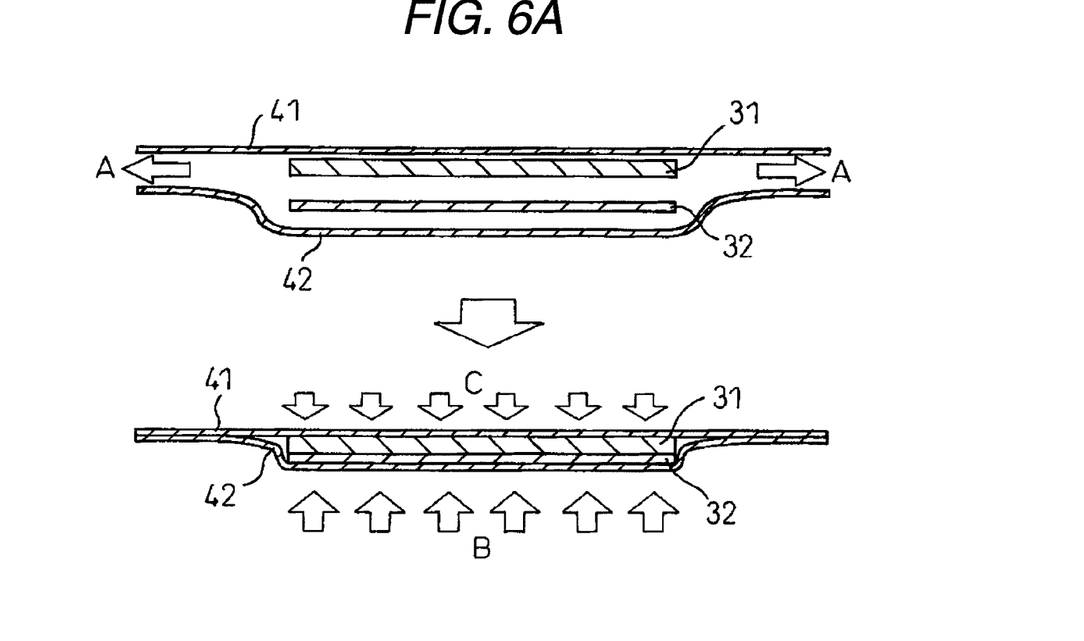
FIGS. 6A and 6B are views showing a method and apparatus for laminating a first optical waveguide material on a base plate and irradiating ultraviolet rays in the embodiment of FIG. 5.
Figure 6B:
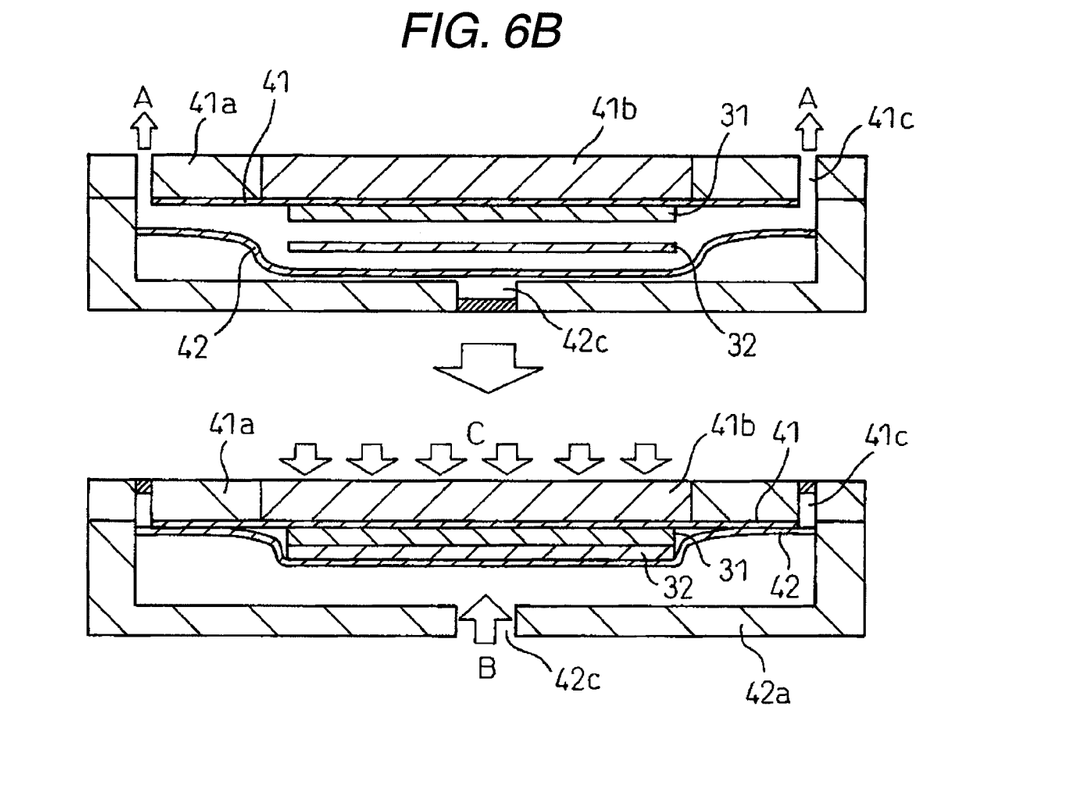

FIGS. 6A and 6B show the method and apparatus in FIG. 5A which serves to execute the step of laminating the first optical waveguide material 32 on the base plate 31 and the step of irradiating ultraviolet rays on the first optical waveguide material 32 through the base plate 31 to cure the first optical waveguide material 32 at the same time according to the first embodiment of the invention. The material to be laminated, that is, the base plate 31 is fixed to an upper laminate film 41 (an upper housing 41a) side, and the base plate 31 and the first optical waveguide material 32 which is uncured are interposed between two laminate films 41 and 42, and a portion between the two laminate films 41 and 42 is decompressed and evaluated (an arrow A) and the pressurized air is then applied into the housing through a pressurizing opening 42c of a lower housing 42a, and a uniform load is applied through air from an outside (a lower side) of the laminate film 42 at the first optical waveguide material 32 side (an arrow B). In the evacuation in a direction of the arrow A, the pressurizing opening 42c of the lower housing 42a is closed and a sucking port 41c of the upper housing 41a is opened. On the other hand, in the application of the pressurized air in a direction of the arrow B, the pressurizing opening 42c of the lower housing 42a is opened and the sucking port 41c of the upper housing 41a is closed.

Figure 5B:
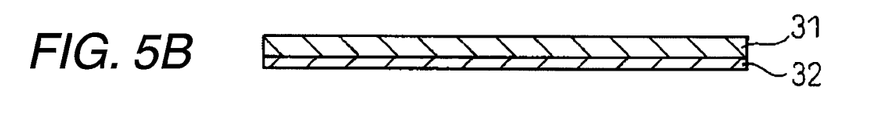

In these cases, in the embodiment according to the invention, it is assumed that both of the two laminate films 41 and 42 are of an ultraviolet transmitting type. Moreover, the lower housing 42a has a window portion 41b formed of a pressure glass which can transmit ultraviolet rays. The window portion 41b has a slightly larger area than the area of the base plate 31 or the first optical waveguide material 32 and the ultraviolet rays irradiated from above through the window portion 41b are further irradiated on the first optical waveguide material 32 through the upper laminate film 41. Through the laminating step, the first optical waveguide material 32 is laminated on the base plate 31, and the first optical waveguide material 32 cured at the ultraviolet irradiating step is shown in FIG. 5B.

Next, a laminated product 41 constituted by the base plate 31 and the first optical waveguide material 32 is vertically inverted as shown in an arrow D.

Figure 5C:
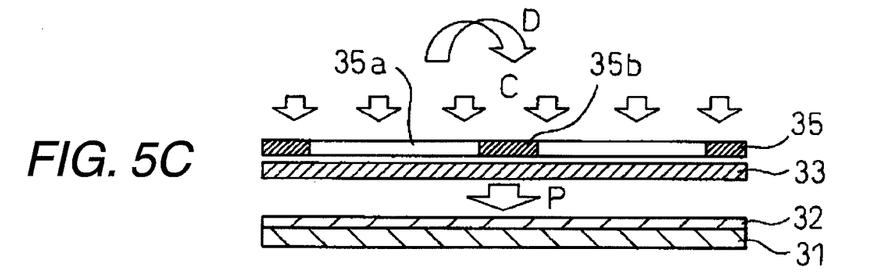
Figure 5D:
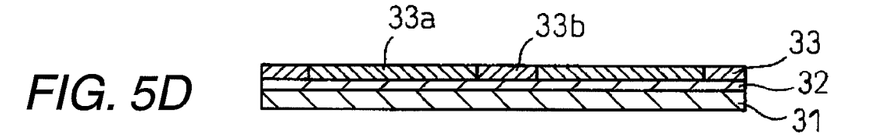

In FIG. 5C, subsequently, a second optical waveguide material 33 is laminated on the laminated product 41 constituted by the base plate 31 and the first optical waveguide material 32, and at the same time, ultraviolet rays are irradiated on the second optical waveguide material 33 by using a mask 35 (an arrow C) to cure the second optical waveguide material 33. As shown in FIG. 5D, accordingly, an exposed portion 33a and an unexposed portion 33b in the second optical waveguide material 33 are generated by the ultraviolet rays transmitted through an opening portion 35a of the mask 35.

Figure 7A:
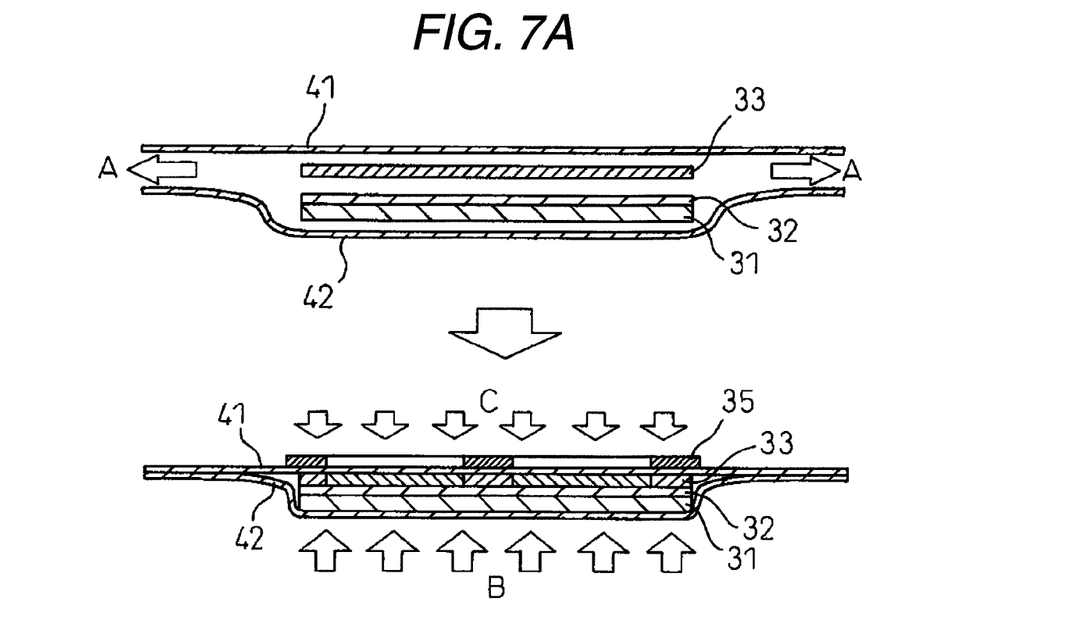
FIGS. 7A and 7B are views showing a method and apparatus for laminating a second optical waveguide material on a laminated product constituted by the base plate and the first optical waveguide material and carrying out patterning in the embodiment of FIG. 5.
Figure 7B:
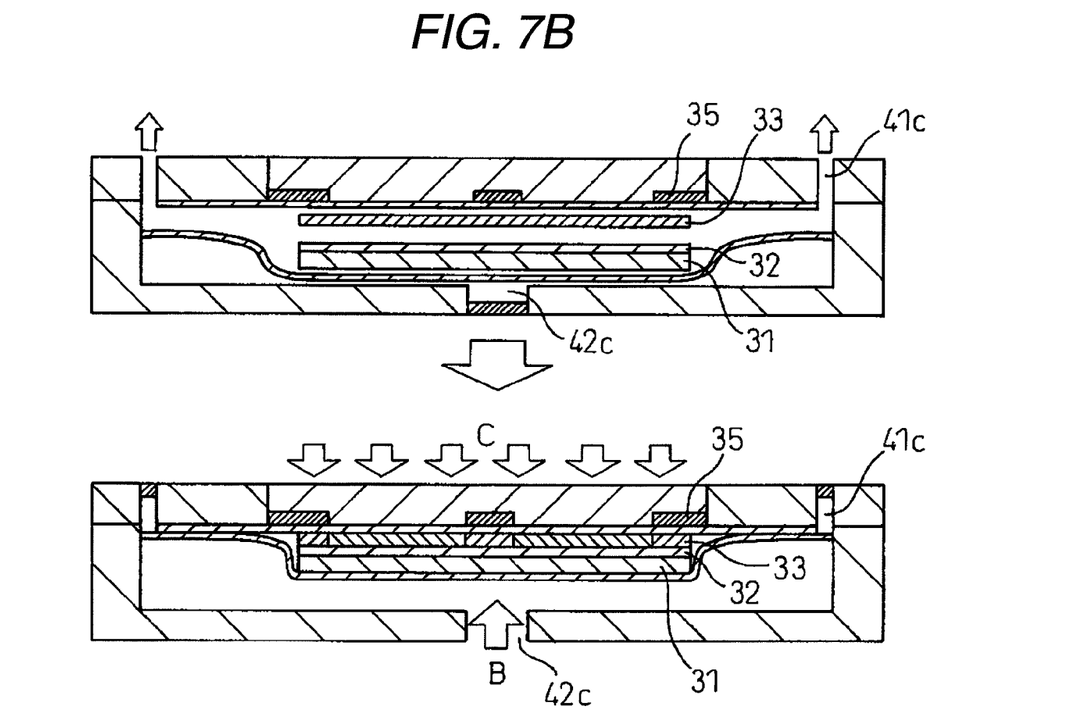

FIGS. 7A and 7B show the method and apparatus in FIG. 5C which serves to execute the step of laminating the second optical waveguide material 33 on the laminated product constituted by the base plate 31 and the first optical waveguide material 32 and the step of irradiating ultraviolet rays on the second optical waveguide material 33 to cure the second optical waveguide material 33 at the same time according to the first embodiment of the invention. The material to be laminated, that is, the laminated product 41 constituted by the base plate 31 and the first optical waveguide material 32 is fixed to a lower laminate film 42 side, and the laminated product 41 and the second optical waveguide material 33 which is uncured are interposed between two laminate films 41 and 42, and a portion between the two laminate films 41 and 42 is decompressed and evaluated (an arrow A) and the pressurized air is then applied into the housing through the pressurizing opening 42c of the lower housing 42a, and a uniform load is applied through air from an outside (a lower side) of the laminate film 42 at the first optical waveguide material 32 side (an arrow B). In the same manner as in the case of FIG. 6, in the evacuation in a direction of the arrow A, the pressurizing opening 42c of the lower housing 42a is closed and the sucking port 41c of the upper housing 41a is opened. On the other hand, in the application of the pressurized air in a direction of the arrow B, the pressurizing opening 42c of the lower housing 42a is opened and the sucking port 41c of the upper housing 41a is closed.

In the same manner as in the case of FIG. 6, moreover, it is assumed that both of the two laminate films 41 and 42 are of an ultraviolet transmitting type. In the lower housing 42a, furthermore, a mask 35 is provided on the window portion 41b formed of a pressure glass which can transmit ultraviolet rays. The window portion 41b has a slightly larger area than the area of the base plate 31 or the first optical waveguide material 32 and the ultraviolet rays irradiated from above through the window portion 41b are further irradiated on the first optical waveguide material 32 through the upper laminate film 41. Through the laminating step, the first optical waveguide material 32 is laminated on the base plate 31, and the first optical waveguide material 32 cured at the ultraviolet ray irradiating step is shown in FIG. 5D.

Figure 5E:
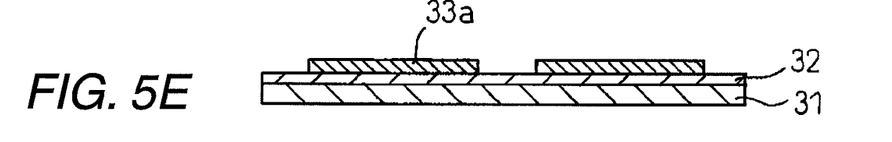

In FIG. 5E, next, a development is carried out to complete patterning for a portion cured by irradiating the ultraviolet rays on the second optical waveguide material 33 through the mask 35. Accordingly, the exposed portion 33a cured in the second optical waveguide material 33 is left and the unexposed portion 33b is removed.

Subsequently, the laminated product 42 constituted by the base plate 31, the first optical waveguide material 32 and the first optical waveguide material 33 (the exposed and cured portion) is vertically inverted (an arrow D).

Figure 5F:
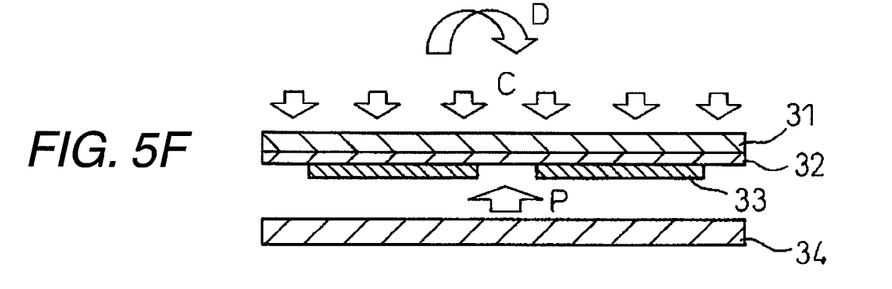

In FIG. 5F, then, a third optical waveguide material 34 is laminated on the second optical waveguide material 33 of the laminated product constituted by the base plate 31, the first optical waveguide material 32 and the first optical waveguide material 33 (the exposed and cured portion). A material of the third optical waveguide material 34 is the same as that of the first optical waveguide material 32.

Figure 8A:
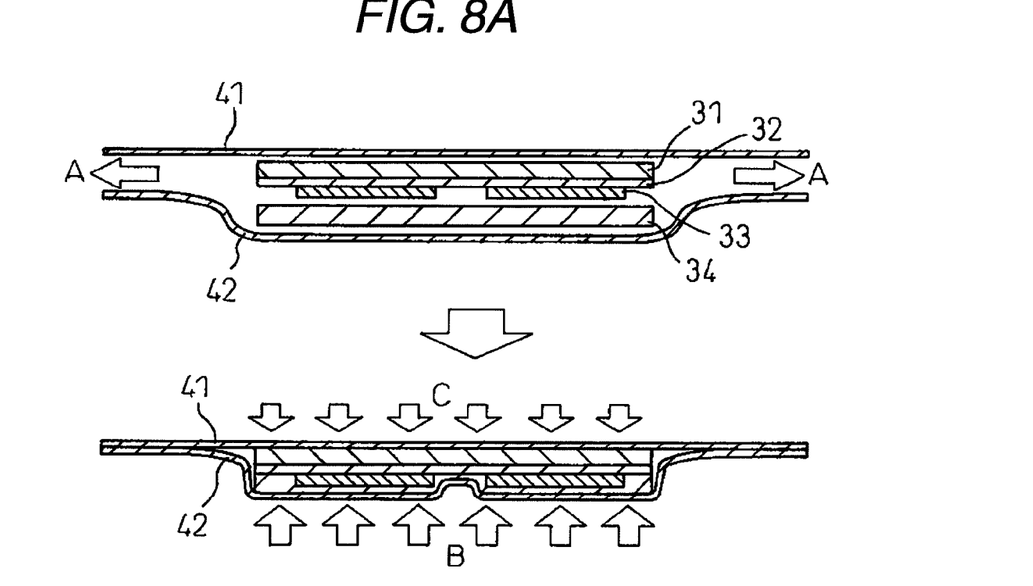
FIGS. 8A and 8B are views showing a method and apparatus for laminating a third optical waveguide material and irradiating ultraviolet rays in the embodiment of FIG. 5.
Figure 8B:
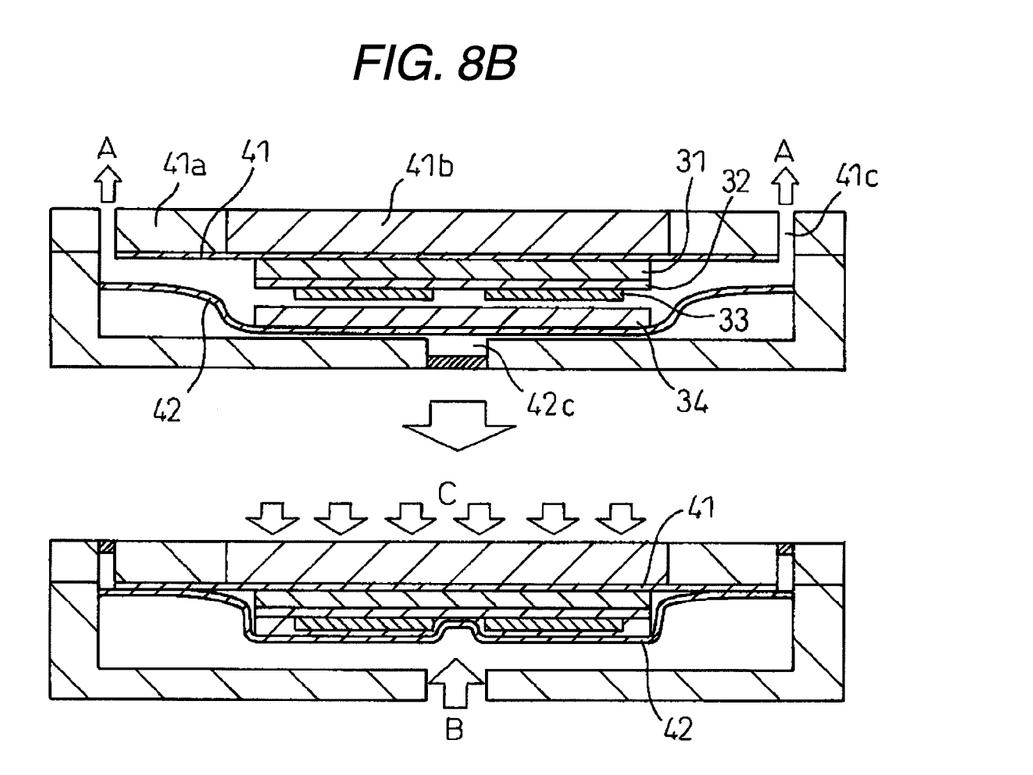

FIGS. 8A and 8B show the method and apparatus in FIG. 5F which serves to execute the step of laminating the third optical waveguide material 34 on the second optical waveguide material 33 of the laminated product constituted by the base plate 31, the first optical waveguide material 32 and the second optical waveguide material 33 and the step of irradiating ultraviolet rays on the third optical waveguide material 34 to cure the third optical waveguide material 33 at the same time.

The material to be laminated, that is, the laminated product constituted by the base plate 31, the first optical waveguide material 32 and the second optical waveguide material 33 is fixed to an upper laminate film 41 side, and the laminated product and the third optical waveguide material 34 which is uncured are interposed between two laminate films 41 and 42, and a portion between the two laminate films 41 and 42 is decompressed and evaluated (the arrow A) and the pressurized air is then applied into the housing through a pressurizing opening 42c of a lower housing 42a, and a uniform load is applied through air from an outside (a lower side) of the laminate film 42 at the third optical waveguide material 34 side (the arrow B).

Figure 5G:
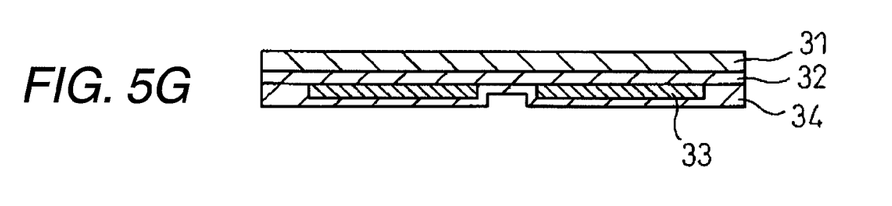

Moreover, the lower housing 42a has a window portion 41b formed of a pressure glass which can transmit ultraviolet rays. The window portion 41b has a slightly larger area than the area of the base plate 31 or the first optical waveguide material 32 and the ultraviolet rays irradiated from above through the window portion 41b are further irradiated on the first optical waveguide material 32 through the upper laminate film 41. FIG. 5G shows a laminated product cured at the laminating step and the ultraviolet irradiating step.

FIGS. 9A to 9I and FIGS. 10 and 11 show a second embodiment of a method and apparatus for laminating an ultraviolet curing type waveguide material according to the invention.

Figure 9A:
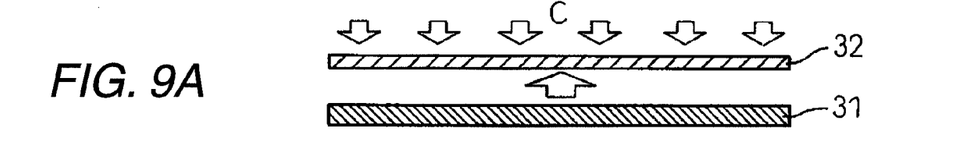
FIGS. 9A to 9I are views showing a process for laminating an ultraviolet curing type waveguide material according to another embodiment of the invention.

In FIG. 9A, first of all, a first optical waveguide material 32 is laminated on a base plate 31 which is a material to be laminated, and at the same time, ultraviolet rays are irradiated on the first optical waveguide material 32 to cure the first optical waveguide material 32. The base plate 31 is thin plate-shaped, and a resin plate such as an acrylic resin plate or a polycarbonate plate or a metal plate is used in the same manner as in the conventional art. For the first optical waveguide material 32, typically, it is possible to use an ultraviolet curing type epoxy based resin material or other acryl based, fluorine polyimide based or silicone based ultraviolet curing type materials in the same manner as in the conventional art.

Figure 10A:
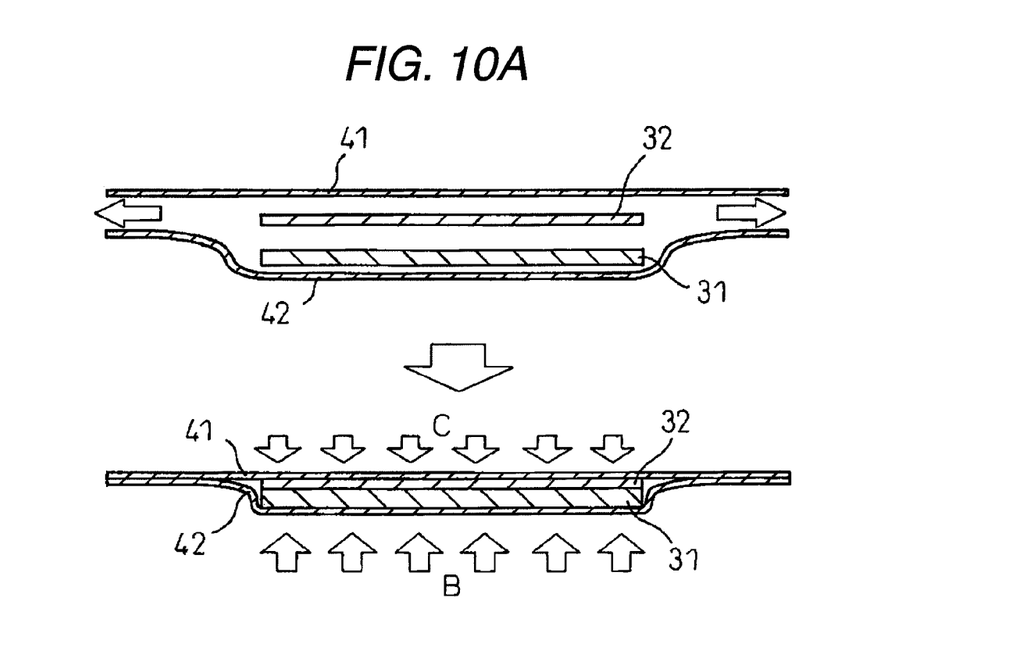
FIGS. 10A and 10B are views showing a method and apparatus for laminating a first optical waveguide material on a base plate and irradiating ultraviolet rays in the embodiment of FIG. 9.
Figure 10B:
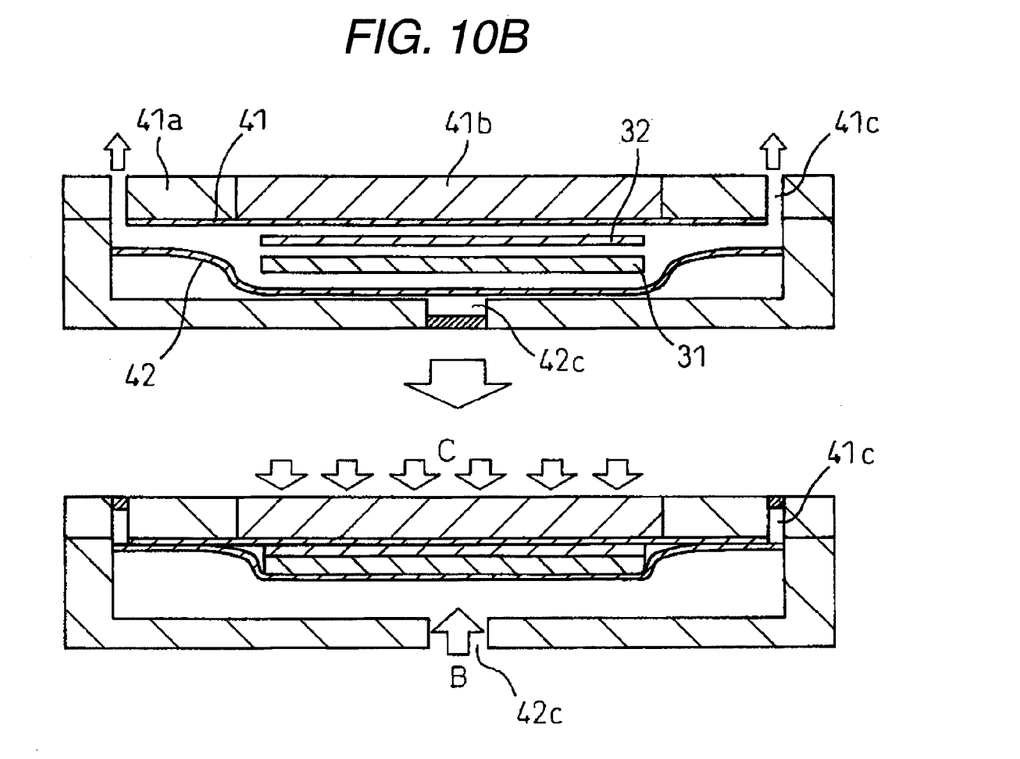

FIGS. 10A and 10B show the method and apparatus in FIG. 9A which serves to execute the step of laminating the first optical waveguide material 32 on the base plate 31 and the step of irradiating ultraviolet rays on the first optical waveguide material 32 through a laminate film 41 to cure the first optical waveguide material 32 at the same time. The material to be laminated, that is, the base plate 31 is fixed to a lower laminate film 42, and the base plate 31 and the first optical waveguide material 32 which is uncured are interposed between two laminate films 41 and 42, and a portion between the two laminate films 41 and 42 is decompressed and evaluated (an arrow A) and the pressurized air is then applied into the housing through a pressurizing opening 42c of a lower housing 42a, and a uniform load is applied through air from an outside (a lower side) of the laminate film 42 at the base plate 31 side (an arrow B). In the evacuation in a direction of the arrow A, the pressurizing opening 42c of the lower housing 42a is closed and a sucking port 41c of the upper housing 41a is opened. On the other hand, in the application of the pressurized air in a direction of the arrow B, the pressurizing opening 42c of the lower housing 42a is opened and the sucking port 41c of the upper housing 41a is closed.

Figure 9B:
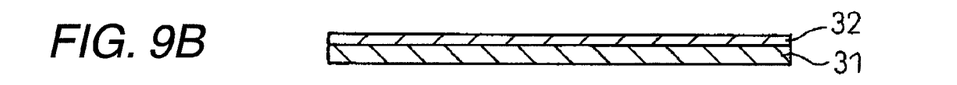

In these cases, in the embodiment according to the invention, it is assumed that both of the two laminate films 41 and 42 are of an ultraviolet transmitting type. Moreover, the lower housing 42a has a window portion 41b formed of a pressure glass which can transmit ultraviolet rays. The window portion 41b has a slightly larger area than the area of the base plate 31 or the first optical waveguide material 32 and the ultraviolet rays irradiated from above through the window portion 41b are further irradiated on the first optical waveguide material 32 through the upper laminate film 41. Through the laminating step, the first optical waveguide material 32 is laminated on the base plate 31, and the first optical waveguide material 32 cured at the ultraviolet irradiating step is shown in FIG. 9B.

Next, a laminated product constituted by the base plate 31 and the first optical waveguide material 32 is vertically inverted as shown in an arrow D.

Figure 9C:
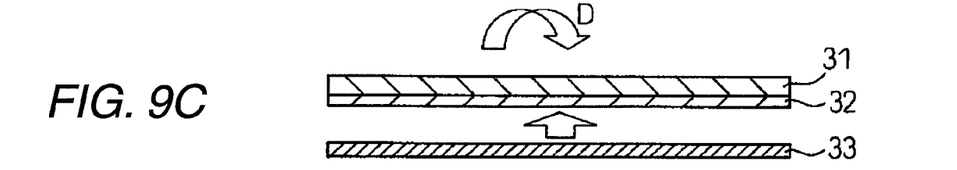
Figure 9D:
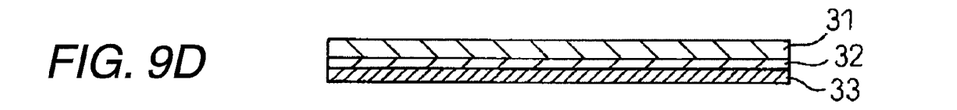
Figure 9E:
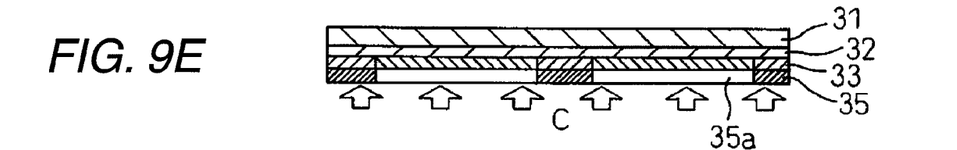
Figure 9F:
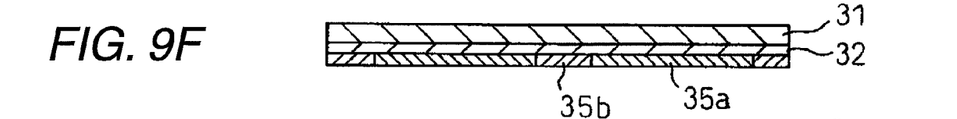

In FIG. 9C, subsequently, a second optical waveguide material 33 is laminated on the laminated product constituted by the base plate 31 and the first optical waveguide material 32 so that a laminated product is obtained as shown in FIG. 9D. As shown in FIG. 9E, next, the ultraviolet rays are irradiated on the second optical waveguide material 33 by using a mask 35 (an arrow C) to cure the second optical waveguide material 33. As shown in FIG. 9F, accordingly, an exposed portion 33a and an unexposed portion 33b in the second optical waveguide material 33 are generated through the ultraviolet rays transmitted through an opening portion 35a of the mask 35.

Figure 9G:
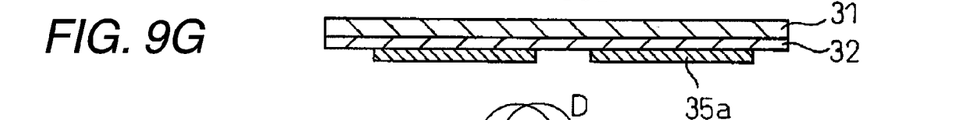

In FIG. 10G, next, a development is carried out to complete patterning for a portion cured by irradiating the ultraviolet rays on the second optical waveguide material 33 through the mask 35. Accordingly, the exposed portion 33a cured in the second optical waveguide material 33 is left and the unexposed portion 33b is removed.

Furthermore, the laminated plate is inverted vertically (an arrow D).

Figure 9H:
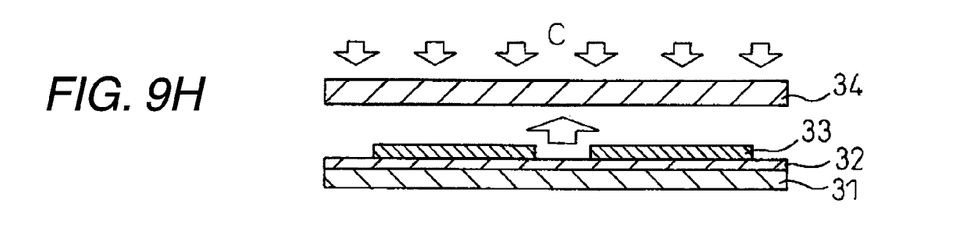
Figure 11A:
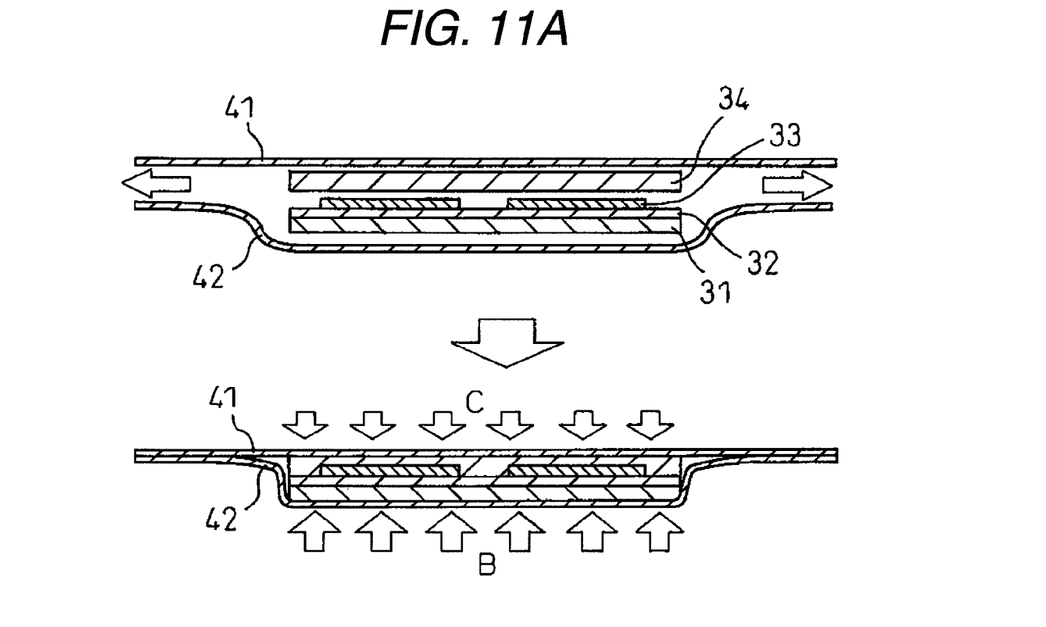
FIGS. 11A and 11B are views showing a method and apparatus for laminating a third optical waveguide material and irradiating ultraviolet rays in the embodiment of FIG. 9.
Figure 11B:
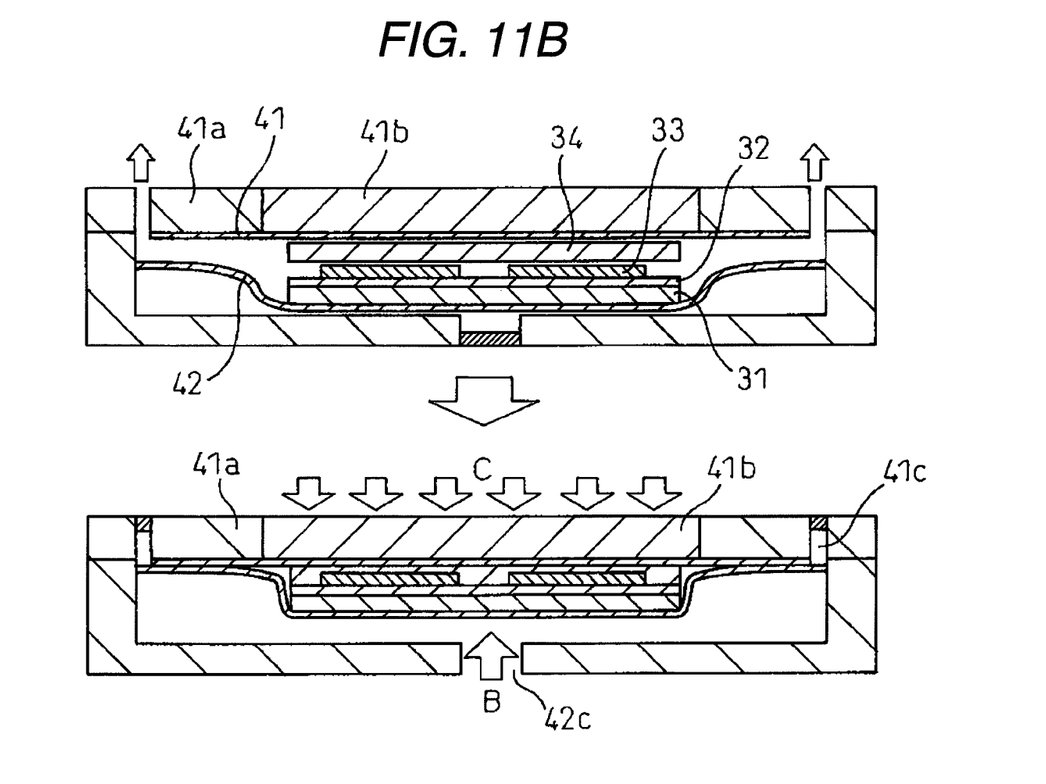

FIGS. 11A and 11B show the method and apparatus in FIG. 9H which serves to execute the step of laminating the third optical waveguide material 34 on the second optical waveguide material 33 of the laminated product constituted by the base plate 31, the first optical waveguide material 32 and the second optical waveguide material 33 and the step of irradiating the ultraviolet rays on the third optical waveguide material 34 to cure the third optical waveguide material 34 at the same time.

The material to be laminated, that is, the laminated product constituted by the base plate 31, the first optical waveguide material 32 and the second optical waveguide material 33 is fixed to a lower laminate film 42 side, and the laminated product and the third optical waveguide material 34 which is uncured are interposed between two laminate films 41 and 42, and a portion between the two laminate films 41 and 42 is decompressed and evaluated (the arrow A) and the pressurized air is then applied into the housing through a pressurizing opening 42c of a lower housing 42a, and a uniform load is applied through air from an outside (a lower side) of the laminate film 42 at the third optical waveguide material 34 side (the arrow B).

Figure 9I:
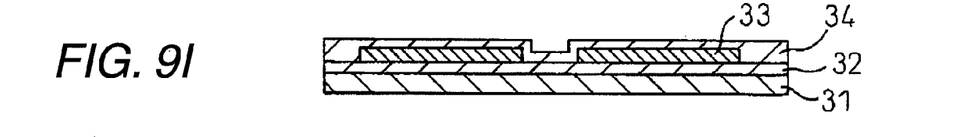

Moreover, the lower housing 42a has a window portion 41b formed of a pressure glass which can transmit ultraviolet rays. The window portion 41b has a slightly larger area than the area of the base plate 31 or the first optical waveguide material 32 and the ultraviolet rays irradiated from above through the window portion 41b are further irradiated on the first optical waveguide material 32 through the upper laminate film 41. FIG. 9I shows a laminated product cured at the laminating step and the ultraviolet irradiating step.

While the embodiments according to the invention have been described above with reference to the accompanying drawings, the invention is not restricted to the embodiments but various modes, changes and modifications can be made without departing from the spirit or scope of the invention.

As described above, according to the invention, it is not necessary to execute two independent processes including a material laminating process and an ultraviolet irradiating process and it is possible to correspondingly decrease a tact time and a cost in the case in which at least two ultraviolet curing type waveguide materials are laminated mutually and ultraviolet rays are irradiated on at least one of the two ultraviolet curing type waveguide materials so as to be cured. Moreover, it is possible to prevent the material from being peeled due to a resin after the lamination by an execution of the lamination and the curing through the ultraviolet irradiation in the same process.

What is claimed is:

1. A method of laminating an ultraviolet curing type waveguide material, comprising the steps of:
   interposing a first optical waveguide material and a base plate between a first film and a second film, the first and second films being flexible;
   decompressing between the first film and the second film so that the second film fits a surface of the first optical waveguide material and side surfaces of the base plate and the first optical waveguide material;
   applying an external air pressure to the second film through a pressurization such that a uniform load is applied to the surfaces of the first optical waveguide and the base plate, and at the same time irradiating ultraviolet rays on the first optical waveguide material through the first film to cure the first optical waveguide material, such that a first laminated product constituted by the base plate and the first optical waveguide material is formed;
   placing a second optical waveguide material on the first optical waveguide material of the first laminated product, and interposing the second optical waveguide material and the first laminated product between the first film and the second film;
   decompressing a space between the first film and the second film so that the second film follows a surface of the base plate and side surfaces of the base plate, the first optical waveguide material and the second optical waveguide material;
   irradiating ultraviolet rays on the second optical waveguide material from the outside of the first film through a mask to carry out patterning at the same time of laminating the second optical waveguide material on the first optical waveguide material by applying an external pressure to the second film using an outside air, after decompressing the space between the first film and the second film, such that a second laminated product constituted by the base plate, the first optical waveguide material and the second optical waveguide material is formed;
   placing a third optical waveguide material on the second optical waveguide material of the second laminated product, and interposing the third optical waveguide material and the second laminated product between the first film and the second film;
   decompressing a space between the first film and the second film so that the second film follows a surface of the third optical waveguide material and side surfaces of the base plate, the first optical waveguide material, and the third optical waveguide material; and
   irradiating ultraviolet rays on the third optical waveguide material from the outside of the first film at the same time of laminating the third optical waveguide material on the second optical waveguide material by applying an external pressure to the second film using an outside air, after decompressing the space between the first film and the second film.

2. The method of laminating an ultraviolet curing type waveguide material according to claim 1, wherein
   all of the first, second and third optical waveguide materials are ultraviolet curing type resin materials, and
   the second optical waveguide material has at least a different refractive index component from that of each of the first and third optical waveguide materials.

3. The method of laminating an ultraviolet curing type waveguide material according to claim 1, wherein
   all of the first, second and third optical waveguide materials are ultraviolet curing type resin materials, and
   the second optical waveguide material has a refractive index component larger than that of each of the first and third optical waveguide materials.

* * * * *